3,251,870
METHOD OF FORMING MONOGLYCERIDES OF CARBOXYLIC ORGANIC ACIDS
Gaston Dalby, New York, N.Y., assignor of one-half to Benj. T. Rauber, Upper Montclair, N.J.
No Drawing. Filed Aug. 7, 1962, Ser. No. 215,300
10 Claims. (Cl. 260—410.7)

My present invention relates to a novel method of forming monoglycerides of carboxylic organic acids and to novel monoglycerides.

Triglycerides of fatty acids have long been known, many of the fats occurring in nature being triglycerides of fatty acids. However, for many purposes, the monoglycerides have desirable properties which the triglycerides lack. Heretofore the monoglycerides have been made from the triglycerides by mixing with the triglycerides a sufficient amount of glycerine and a catalyst and raising the temperature of the mixture to accelerate a reaction between the added glycerine and the triglycerides in which some of the fatty acid radicals leave the triglyceride and combine with the free, added, glycerine. A mixture of monoglycerides, diglycerides and triglycerides is formed which may be used as such or the monoglyceride may be separated by molecular distillation.

Monoglycerides may also be made from a free fatty acid and free glycerine by an esterification reaction as follows:

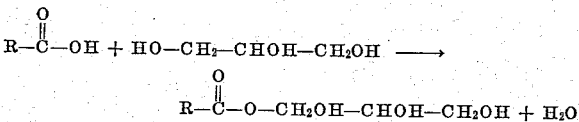

R being a carbon chain. This type of reaction tends to be sluggish and special methods must be used to make it go. Monoglycerides can not be made by esterification of glycerine with polycarboxylic organic acids as these acids would tend to form long chain polyesters.

In my present invention I avoid the above disadvantages by a direct combination of a carboxylic acid and glycidol in the proportion of one molecule of glycidol for each carboxylic group of the acid. Glycidol has the structure represented by the formula:

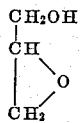

It is liquid at ordinary temperatures and has a boiling point at atmospheric pressures of about 166–167° C.

In the process of my invention, the monoglyceride is formed by the reaction of a carboxylic acid with the glycidol according to the reaction:

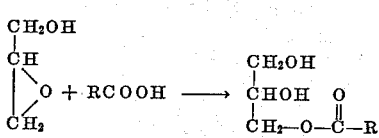

in which R is an organic radical such as a carbon chain or ring or a substituted carbon chain or ring. It may be a carbon chain having an additional carboxylic group. In the case of a dicarboxylic acid the reaction would take place between two glycidol molecules and one acid molecule, the two glycerine molecules being used in order to combine with the two carboxylic radicals of the acid.

The generic formula of the resulting monoglyceride would be as follows:

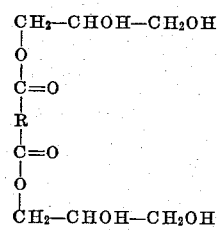

in which R is a carbon chain, for example, of four carbon atoms in the case that adipic acid is used to combine with the glycidol.

The following typical examples illustrate the process:

Example 1

Stearic acid is mixed with glycidol in equal molar proportions, that is, 74 parts of glycidol to 284.2 parts of stearic acid by weight, and the mixture is heated to a temperature sufficient to melt the stearic acid, that is to a temperature of 70° C. or somewhat above and held at this temperature for approximately thirty minutes. As there are no by-products and as the reaction goes to completion, no purification is required.

The monoglycerides of other fatty acids may be formed similarly, suitably modifying the proportions by weight of the glycidol and acid to maintain equal molal proportions. For example, in the case of oleic acid the proportions would be 74 parts by weight of glycidol to 282.2 parts of the acid and in the case of palmitic acid the proportions would be 74 parts of glycidol to 256.2 parts by weight of the acid.

Example 2

In the forming of monoglycerides of di-carboxylic acids the proportions would be two moles of the glycidol to one mole of the acid. Thus in the case of adipic acid the proportions would be 74 parts by weight of glycidol to 73 parts by weight of the adipic acid. The adipic acid would be melted in the glycidol and thoroughly mixed therewith and held at or above the melting temperature for about thirty minutes until the reaction is complete. As the reaction proceeds to completion and there are no by-products, no purification is required.

The process can be used with other dicarboxylic acids such as malonic, succinic, glutaric, pimelic, suberic and azelaic, the proportions by weight being changed to maintain the molal ratio of the glycidol to acid at 2:1. Similarly the process may be used with the dibasic acids such as tartaric.

Example 3

The formation of monoglycerides of tri-carboxylic acids, such as citric acid, is similar to that of the formation of the monoglycerides of di-carboxylic acids, the molal proportions being three moles of glycidol to each mol of the acid. Thus for citric acid the ratio of citric acid to glycidol is 64 parts by weight of the acid to 74 parts by weight of glycidol. The citric acid is melted in the glycidol and mixed therein and held at the melting temperature of slightly above for about thirty minutes or until the reaction is complete.

Example 4

As illustrating the formation of monoglycerides of aromatic acids the glycidol may be combined in equimolal proportions with benzoic acid, salicylic acid or cinnamic acid. Thus to form the monoglyceride of benzoic acid the acid is mixed with the glycidol in the ratio of 74 parts by weight of glycidol to 122 parts by weight of benzoic acid and heated to melt the benzoic acid in the glycidol and mix it therewith. The reaction then proceeds to completion.

In similar manner the glycidol may be reacted with salicylic acid in the ratio of 74 parts of glycidol to 138 parts by weight of salicylic acid to form monoglyceride of salicylic acid. The glycidol may be similarly reacted with cinnamic acid in the ratio of 74 parts by weight of glycidol to 148 parts by weight of cinnamic acid.

The monoglycerides of the higher fatty acids such as palmitic, oleic and stearic have valuable functional properties as anti-staling agents for baked food products containing starch, and as emulsifiers in water and fat systems. It is generally believed that a monoglyceride, such as glyceral monostearate functions by the free hydroxyls attaching themselves to the starch chains by hydrogen bonding. The stearic acid residue by virtue of its size is able, by steric hindrance, to delay starch retrogradation, that is, to delay the lining up of the starch chains with each other by hydrogen bonding. Glyceral monostearate is more effective than glyceral mono-oleate. Oleic acid has a double bond in the center of the molecule and tends to bend at this point thus making the effective length shorter than that of stearic acid.

The monoglyceride of dicarboxylic acids, such as the monoglyceride of adipic acid, has a glyceric residue at each end of the molecule which is able to attach itself to a starch chain and thus form a strong bond between two starch chains thus preventing or strongly opposing retrogradation.

The usage level in bakery products, and in cereal products such as pasta, would be in the range of 0.1% to 0.5% based on the total flour or cereal.

The monoglyceride of citric acid, a tricarboxylic acid, also functions as a retrogradation blocking agent and its usage level is in the same range.

An emulsifier usually consists of a molecule which contains a hydrophylic and a hydrophobic group. The monoglycerides of the dicarboxylic acids form emulsifiers in which the two glycerine residues function as the hydrophylic groups. The inner chain functions as the hydrophobic group. Thus by varying the chain length, a series of emulsifiers of different functional value may be obtained.

Having described my invention, I claim:

1. A process of forming a monoglyceride of a carboxylic acid which comprises mixing glycidol with a carboxylic acid of not less than 3 carbon atoms and of not more than 18 carbon atoms and not more than 3 carboxyl groups in the ratio of one mol of glycidol for each carboxyl group of one mol of the acid and maintaining the temperature of the mixture sufficiently high to melt the acid during the reaction between the glycidol and the acid.

2. The process of claim 1 in which the acid is a monocarboxylic acid of not less than eleven carbon atoms.

3. The process of claim 2 in which the acid is stearic acid.

4. The process of claim 1 in which the acid is a polycarboxylic acid of not less than three carbon atoms.

5. The process of claim 4 in which the acid is a dicarboxylic acid.

6. The process of claim 5 in which the acid is adipic acid.

7. The process of claim 1 in which the acid is a tricarboxylic acid.

8. The process of claim 7 in which the acid is citric acid.

9. The process of claim 1 in which the acid contains a carbon ring of six carbon atoms.

10. The process of claim 9 in which the acid is salicylic acid.

References Cited by the Examiner
UNITED STATES PATENTS

| | | | |
|---|---|---|---|
| Re. 23,866 | 9/1954 | Ericks | 260—485 |
| 1,963,762 | 6/1934 | Pungs et al. | 260—485 |
| 2,089,569 | 8/1937 | Orthner et al. | 260—410.6 |
| 2,523,309 | 9/1950 | Kester | 260—410.7 |
| 2,759,967 | 8/1956 | Cash et al. | 260—410.7 |

CHARLES B. PARKER, *Primary Examiner.*

DAVID D. HORWITZ, *Examiner.*